Figure 3:
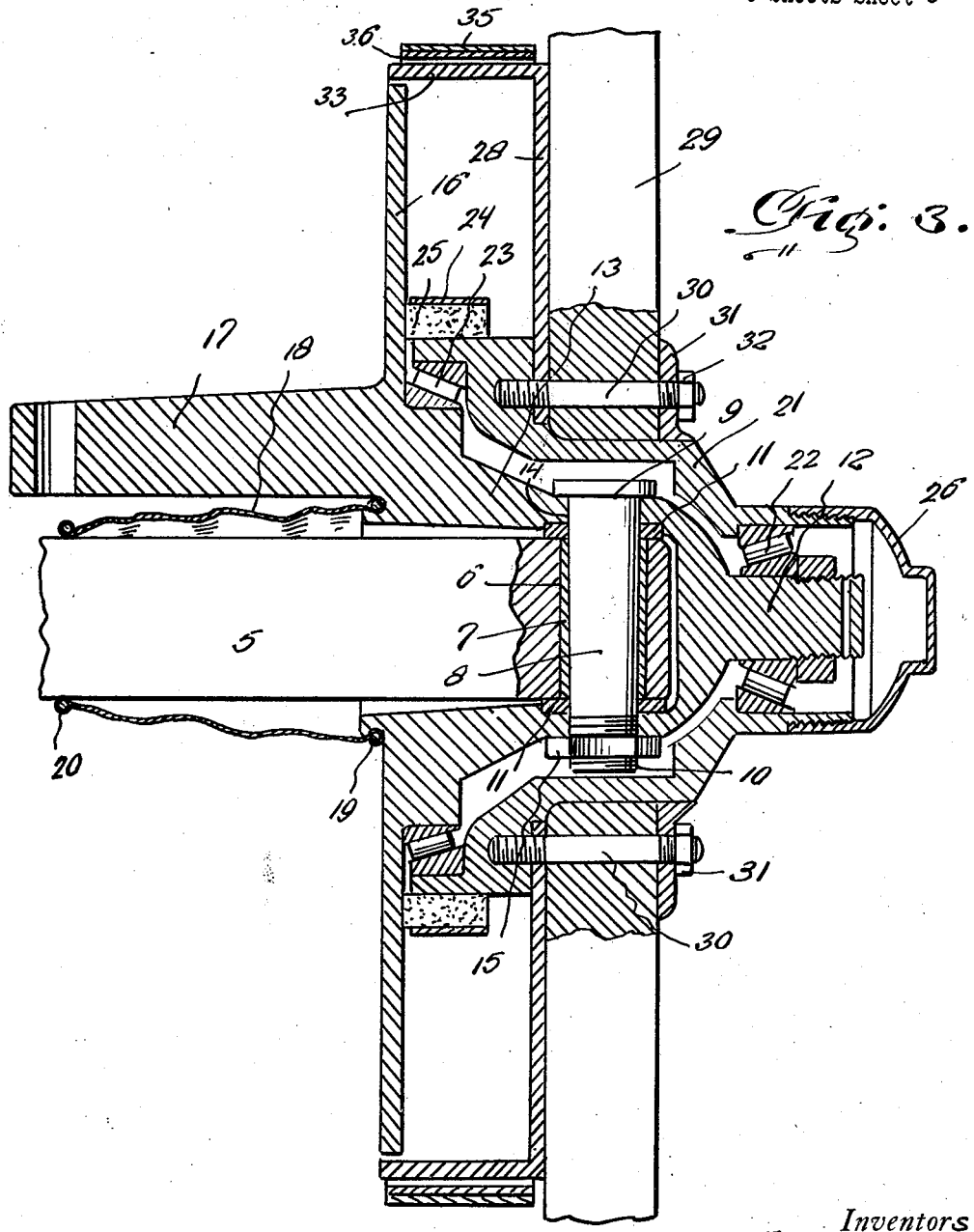

Dec. 20, 1927.
J. A. PEDERSEN ET AL
1,653,061
FRONT AXLE AND SPINDLE ASSEMBLY
Filed May 13, 1926
3 Sheets-Sheet 1
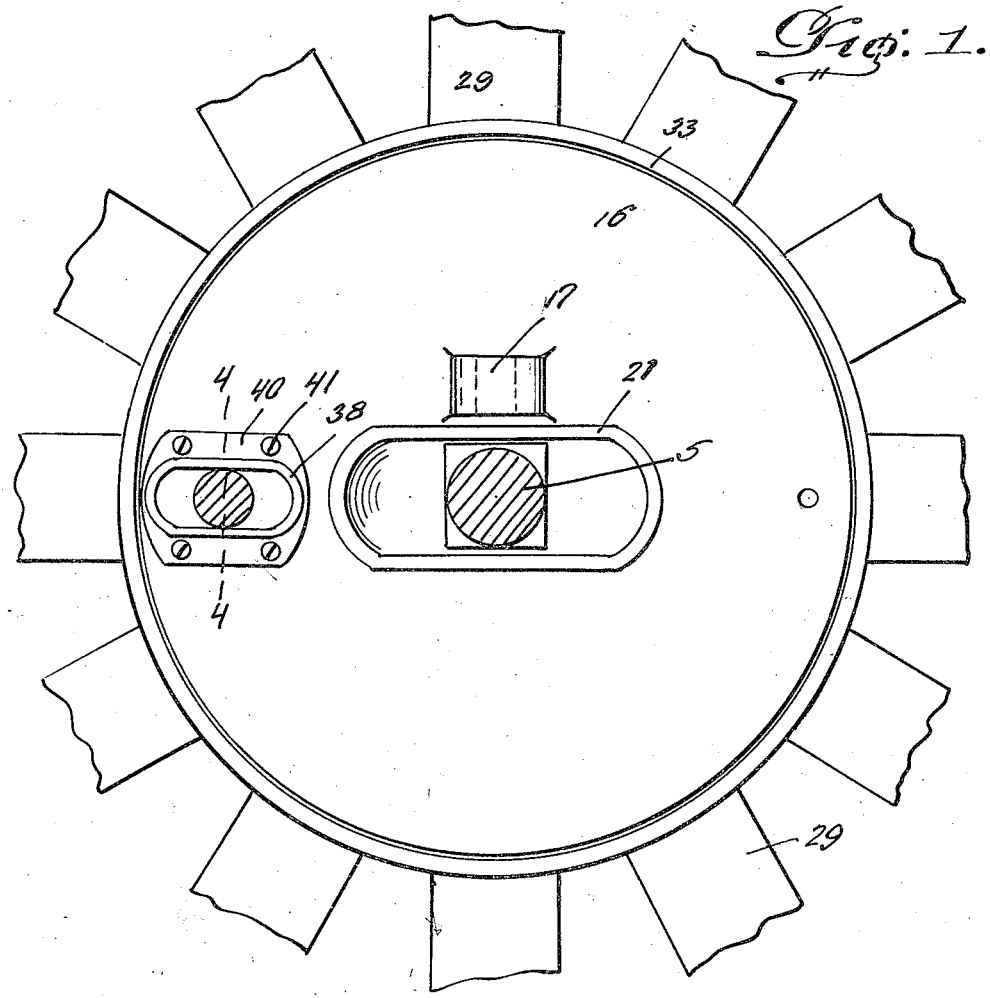
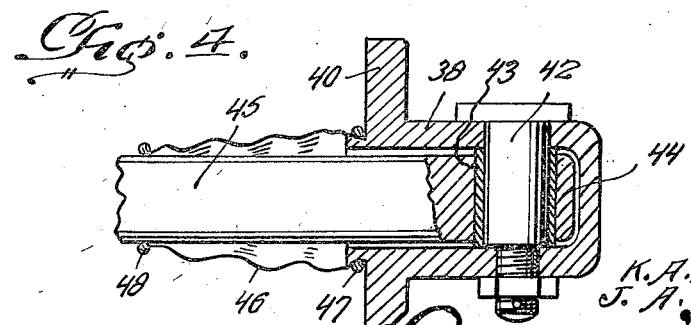
Inventors
K. A. Pedersen,
J. A. Pedersen,
By Clarence A. O'Brien
Attorney

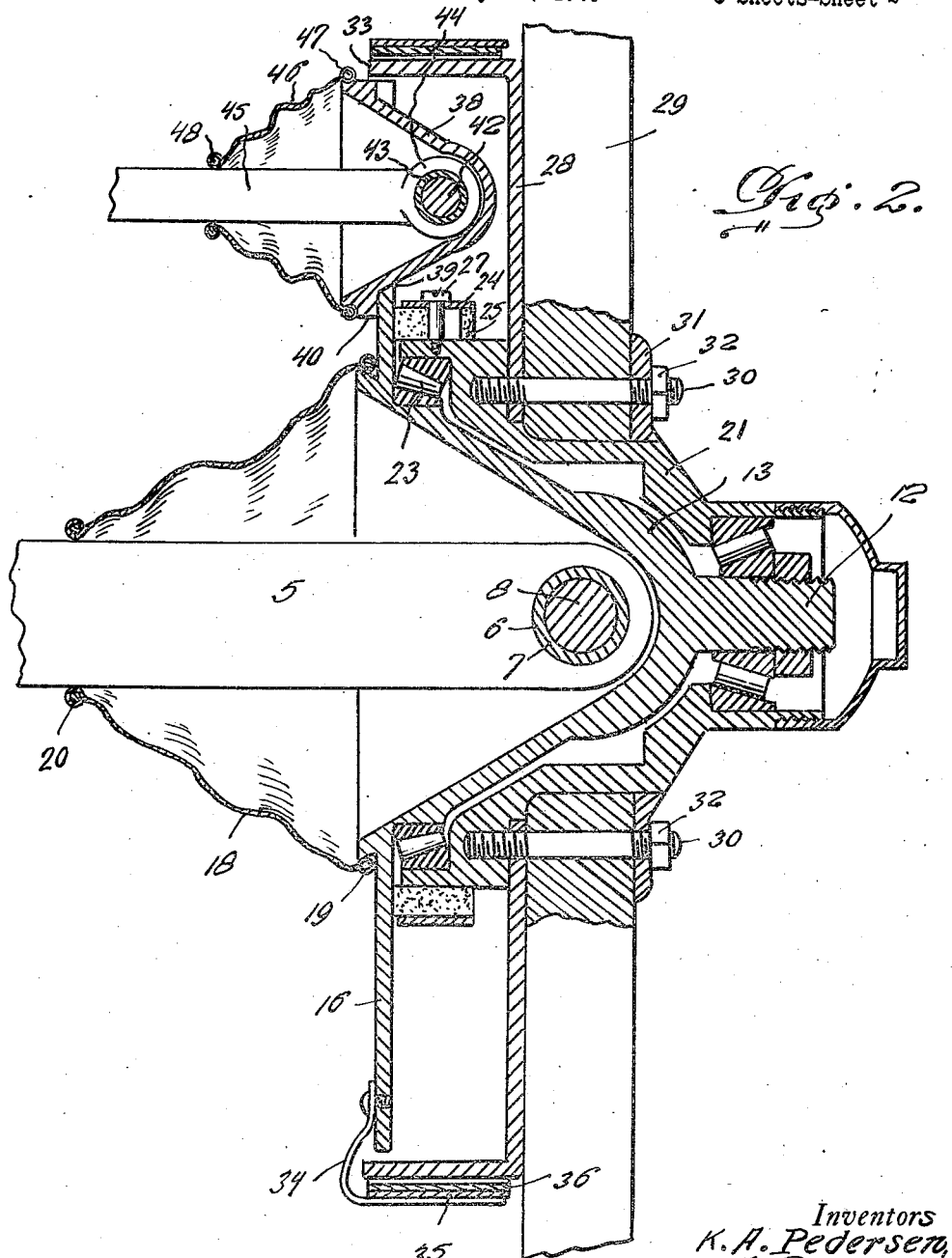

Dec. 20, 1927.

J. A. PEDERSEN ET AL 1,653,061

FRONT AXLE AND SPINDLE ASSEMBLY

Filed May 13, 1926  3 Sheets-Sheet 3

Inventors
K. A. Pedersen,
J. A. Pedersen,

By Clarence A. O'Brien
Attorney

Patented Dec. 20, 1927.

1,653,061

UNITED STATES PATENT OFFICE.

JAMES A. PEDERSEN AND KENNETH A. PEDERSEN, OF TACOMA, WASHINGTON.

FRONT AXLE AND SPINDLE ASSEMBLY.

Application filed May 13, 1926. Serial No. 108,858.

The present invention relates to an improved front axle and spindle assembly and has for its principal object to provide an assembly which is exceedingly simple in its construction, strong and durable, efficient and reliable in operation, easy to manipulate, readily assembled and disassembled, not likely to easily become out of order, dust-proof, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a fragmentary inside elevation of one front wheel showing the axle and spindle connecting rod in section, Fig. 2 is a vertical section therethrough, Fig. 3 is a horizontal section therethrough, Fig. 4 is a detail section through the spindle connecting rod housing, taken substantially on the 4—4 of Fig. 1.

Referring to the drawing in detail, it will be seen that 5 designates an axle which is provided in each end with an opening. In the accompanying drawing, I have illustrated the left hand side only of the axle and spindle assembly. The opening in this end of the axle 5 is denoted by the numeral 6 for receiving a bushing 7 through which extends the spindle bolt 8, having a head 9 at its upper end and a threaded portion 10 at its lower end. Thrust washers 11 are disposed on the spindle bolt 8, one at the upper side of the axle 5 and the other at the lower side thereof. The numeral 12 denotes a spindle which is provided integrally with an inwardly extending casing 13 for housing the end of the axle side.

This casing 13 is provided with registering openings 14 through which the spindle bolt 8 passes. The bolt is held in place by a nut 15 engaging the threaded end 10. The inner end of the casing 13 merges into a disk 16 from which projects a drag link arm 17. A boot 18 of flexible material has a wire reinforced bead 19 at one end engaged over the inner end of the casing 13 and a similar bead 20 at the other end thereof engaged over the axle 5, thus allowing the spindle and casing to revolve on the bolt 8 and prevent dust from getting inside the casing 13.

A hub 21 is rotatable on the spindle 12 and its casing 13 by means of roller bearings 22 and 23. A ring 24 holds packing 25 in place about the hub 21 and in engagement with the disk 16 to prevent dust from getting into the bearing 23 and inside the hub. A hub cap 26 is threaded on the outer end of the hub 21. The ring 24 is preferably held in place by suitable fastening elements 27. A brake drum 28 and spokes 29 are held in assembly on the hub 21 by bolts 30, hub flange 31, and nuts 32.

The bolts 30 pierce the openings provided in the flange 31, the spokes 29, and the drum 28 and is threadedly engaged in the hub 21. The annular portion 33 of the brake drum 28 terminates about the periphery of the disk 16. A bracket 34 on the disk 16 holds brake band 35 and its lining 36 about the annular portion 33 of the drum 28. The brake band 25 will be contracted in any suitable or well known manner.

A spindle connecting rod housing 38 is mounted in an opening 39 provided in the disk 16 and has its flange 40 attached to said disk by means of screws or other fastening elements 41, as is clearly shown in Fig. 1. At the closed end of the housing 38, there is mounted transversely thereof, a spindle connecting rod pin 42 having a bushing 43 disposed thereabout and mounted in the bearing 44 of a spindle connecting rod 45. A boot 46 has a wire reinforced bead 47 at one end engaged over the open end of the spindle connecting rod housing 38 and a similar bead 48 at the other end thereof engaged about the spindle connecting rod 45 for the purpose of keeping dust and grit out of the housing 38.

It is thought that the construction, operation, and advantages of the invention will now be clearly understood without a more detailed description thereof. The present embodiment of the invention has been disclosed in detail merely by way of example, since in actual practice it attains the features of advantage enumerated as desirable in the statement of the invention and the above description.

It is apparent that numerous changes in the details of construction, and in the combination and arrangement of parts may be resorted to without departing from the spirit or scope of the invention as hereinafter claimed, or sacrificing any of its advantages.

Having thus described our invention, what we claim as new is:—

1. In combination, an axle, a spindle having a casing formed thereon for receiving one end of the axle, a spindle bolt extending through registering openings provided in the casing and in the axle, a disk formed on the spindle casing and having an opening, a pin in the casing, and a spindle connecting rod extending through the opening and engaged with said pin.

2. In combination, an axle, a spindle mounted on the axle, a disk mounted on said spindle and having an opening, a spindle connecting rod housing mounted in said opening, a pin in said housing, and a spindle connecting rod extending into the housing and engaged with the pin.

In testimony whereof we affix our signatures.

JAMES A. PEDERSEN.
KENNETH A. PEDERSEN.